Figure 1:
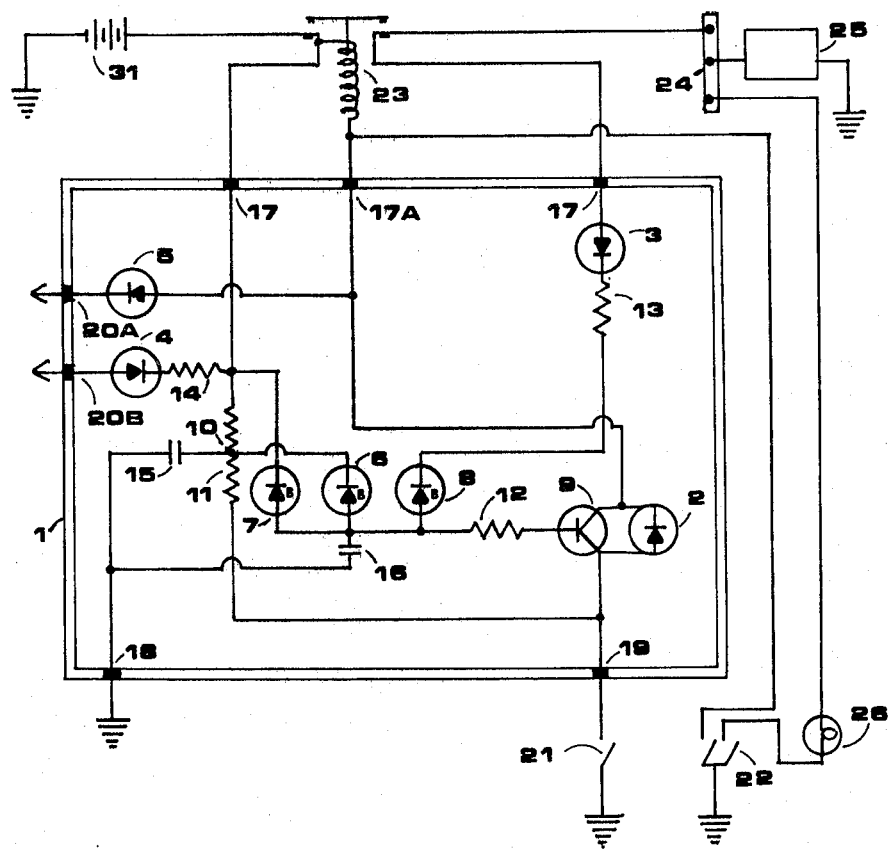

United States Patent [19]

Willett

[11] 4,087,847

[45] May 2, 1978

[54] SOLID-STATE ELECTRONIC SAFETY DEVICE

[76] Inventor: William C. Willett, P. O. Box 7387, Mobile, Ala. 36607

[21] Appl. No.: 721,772

[22] Filed: Sep. 9, 1976

[51] Int. Cl.² .................................................. H02H 3/24
[52] U.S. Cl. ..................................... 361/92; 307/10 BP
[58] Field of Search .......... 361/92; 307/10 BP, 10 LS

[56] References Cited

U.S. PATENT DOCUMENTS

| 3,445,746 | 5/1969 | Delatorre | 361/92 X |
| 3,656,045 | 4/1972 | Frezzolini et al. | 361/92 X |
| 3,818,267 | 6/1974 | Hill et al. | 307/10 LS X |

Primary Examiner—Harry E. Moose, Jr.
Attorney, Agent, or Firm—Harold C. Hogencamp

[57] ABSTRACT

A voltage-sensing solid-state electronic device for protection against the danger of fire originating in electric circuits, wiring and apparatus caused by defects or malfunction in said wiring or apparatus. Especially applicable for installation and use in aircraft.

2 Claims, 1 Drawing Figure

SOLID-STATE ELECTRONIC SAFETY DEVICE

The presently-disclosed invention relates to an improved SOLID-STATE ELECTRONIC SAFETY DEVICE and the component circuitry thereof. It is of particular value as a means of preventing and/or minimizing the danger of fire starting in the electrical circuits and apparatus in an aircraft.

One of the greatest hazards in an aircraft, especially while in the air but also on the ground, is the danger of fire originating in the, often complicated, electrical wiring and/or the electrical apparatus, appliances, and components connected to said wiring. The electrical power supplied to the apparatus thru said wiring is most often derived from storage batteries which are constantly being kept fully charged while the aircraft is in operation.

Especially in the larger commercial airlines and military planes extensive precautions are taken by installation of fire detection equipment to indicate when and if a fire occurs. However, such devices act to give warning after a fire has actually started.

The device entailed in the present invention acts to prevent or retard the occurrence of such a fire which might be started due to defects or malfunctions in the electrical wiring and/or electrical apparatus installed in an aircraft. It is equally applicable and effective in small planes and helicopters as well as in the larger aircraft and regardless of the extensiveness of wiring and/or amount of apparatus or normal electrical current drain thereof. While here shown and described as for use with storage battery power supply, it might also be used with generator power supply of constant voltage and of limited output capacity.

In the prior art there are numerous patents relating to protection of electrical apparatus from damage which might be caused by overvoltage and/or undervoltage from the power supply: for indicating when a storage battery is discharged, or has reached a pre-determined discharge state: for disconnecting apparatus or portions thereof when its storage battery power source reaches a certain discharge state: etc.

By comparison — The device of the present invention is primarily designed as a safety device — to protect against the starting of a fire in the electrical circuits, wiring and apparatus, or to deter the start of such a fire.

While all electrical apparatus components are inherently protected by this device against further damage should a defect or short circuit occur within them, this is only incidental to the primary object of the invention which is the protection against the starting of fire in electrical circuits and apparatus.

Other objects will become apparent from the drawing, this disclosure, and the appended claims.

In considering the protective capabilities of this device, it is to be noted that so-called electrical fires — fires originating in electrical circuitry do not start instantaneously, i.e. — before the insulation or other nearby flammable material gets on fire the electrical conductor or wire, whether within the apparatus or supplying current to it, or the apparatus itself must become red hot or white hot. Such an amount of heating takes a measurable length of time. My device is near instantaneous in action and this precludes the heating of the conductor to its red hot or white hot danger point, this preventing an otherwise almost-sure fire.

Theory of operation: Using an electric power souce having substantially constant voltage output under normal load conditions, such as a fully charged storage battery which is constantly having its charge maintained or replenished during use, as from an electric generator or alternator (rectified), any excessively heavy current drain in its load circuit greater than normal current-supply capacity will cause a voltage drop in the load circuit. The protection capability of the device of the present invention becomes operative by reason of sensing this voltage drop. Voltage variations within the perimeters of the device are allowable but any sudden overload or excessive current drain causing an appreciable voltage drop triggers the device to nearly instantaneously cut-off to open the electrical supply circuit. This cut-off occurs before the electrical conductors or wires are given time to heat to a fire-starting temperature.

Also, secondary to its prime fire-prevention function, it is obvious that my device will act to shut off all power to the bus-bar circuit and thus the electrical apparatus connected thereto if the storage battery reaches a certain lowered discharge voltage should the pilot forget to turn off such apparatus when he parks his aircraft. If for instance this lowered cut-off voltage from a 12 volt battery was 10 volts, the battery would still retain enough energy, plus some rest-recuperation, to start the aircraft and the battery would then be recharged to normal voltage, and maintained at this voltage during operation of the aircraft.

In the drawing: invention and patent is claimed only for the portion enclosed by double lines and designated as safety device 1, including the circuit and unique combination of components therefor: 2, 3, 4, and 5 are diodes; 6, 7 and 8 are zener diodes; 9 is an NPN power transistor; 10, 11, 12, 13 and 14 are resistors; 15 and 16 are capacitors.

Terminals for connection to the external electric circuit are designated: 17, 17 and 17A to master switching relay 23 as shown; 18 to negative ground; 19 to master switch 21; 20A and 20B, with arrows, to aircraft engine starter relay (not shown).

No values or types are given for the components as shown in the drawings since it is contemplated that specific values would need to be chosen for specific installations depending upon voltage and/or current requirements of the circuitry with which this safety device 1 is incorporated.

The drawing also includes, shown connected to but not part of device 1: master switch 21; auxiliary switch 22; master switch power relay 23; bus-bar circuit 24; electrical apparatus 25; pilot light 26; and power source (battery) 31.

In use, safety device 1 operates as follows, certain voltage values being specified only by way of example and only for one typical installation:

With master switch 21 in the open or off position, capacitor 15 will be fully charged from battery 31 through resistor 10 - the charging circuit being completed through capacitor 15 itself to the grounded negative terminal of battery 31. One terminal of resistor 11 is connected in common with the terminal of resistor 10 and capacitor 15. However, the other end of resistor 11 remains ungrounded (not connected to the negative terminal of battery 31) when master switch 21 is open. Therefore it has no voltage across it.

When master switch 21 is closed, the series-arranged circuit of resistors 10 and 11 is completed across battery 31, and the parallel or shunt circuit of resistor 11 and capacitor 15 is also formed. Therefore the initial fully charged voltage of capacitor 15 will need to be reduced to a voltage value equal to that now existing across resistor 11; capacitor 15 being discharged to this value through resistor 11 shunted across it.

As an example, and to clarify this: If battery supply 31 is of 12 volt output, and with master switch 21 open, capacitor 15 would initially be charged to (approximately) 12 volts. With resistor 10 and resistor 11 being in series and connected across battery 31 (master switch closed) resistor values are such that the voltage across resistor 11, and so the voltage applied to capacitor 15, shunted across resistor 11, would then be only 2 or 3 volts. The charge-voltage of capacitor 15 would accordingly need to be reduced from 12 volts to 2 or 3 volts by partial discharge through resistor 11 which is shunted across it.

However, the portion of the circuit of device 1 which includes zener diode 6, resistor 12, power transistor 9, and capacitor 16 is also shunted across capacitor 15 when master switch 21 is closed and this also must be considered in the operation. Again, the example-voltages will be used in explaining this operation.

With the nominal voltage across resistor 11 when connected into the circuit (and therefore across capacitor 15) being 2 or 3 volts, zener diode 6 is selected to operate at approximately 6 volts (½ of battery 31 voltage). Therefore, while the capacitor 15 is being discharged and until the capacitor 15 voltage has been reduced from 12 to 6 volts, current will flow through zener diode 6, applying turn-on or conduction bias to the base terminal of power transistor 9. This bias voltage causes conduction of power transistor 9 to energize the master-power relay 23, closing its contacts and thus providing power to the bus-bar 24 circuit and any electrical apparatus connected thereto.

The turn-on timing is determined by the discharge time of capacitor 15 through zener diode 6 and resistor 12 and the base emitter of transistor 9. After capacitor 15 discharges to approximately 6 volts through zener diode 6 (resistor 11 also providing a discharge path) there is no current flow through zener 6 so power transistor 9 ceases to conduct and master-power relay 23 would open except for an added feature in device 1.

This initial circuit-closing action occurs immediately upon the closing of master switch 21 and cannot reoccur until switch 21 is opened and again closed.

Upon closure of relay 23, the series circuit of diode 3, resistor 13, zener diode 8 and resistor 12 acts to maintain bias on power transistor 9 so long as the voltage on bus-bar 24 is sufficient to maintain current through zener diode 8. The operating value of zener 8 is here selected to be 10 volts, approximately 85% of normal battery 31 voltage (85% of 12 volts equals 10.2v).

Diode 2 prevents forward-biasing of collector to base junction of power transistor 9 and protects power transistor 9 from any reverse current. Diode 3 prevents any positive voltage from being on bus-bar 24 with master relay 23 open. Capacitor 16 is used to momentarily hold the bias on the power transistor 9 during engine starting, to allow the bias to come from the engine-starter relay, if it is positive energized, through diode 4, resistor 14 and zener 7. Capacitor 16 also acts to hold device 1 operative during any momentary low voltage spikes. Diode 4 prevents any voltage from being applied to the engine-starter relay contact when the starter is not intended to be energized. If the engine starter relay is negative energized, the ground (negative) is applied through diode 5 to master relay 23 to keep it energized during starting of engine.

Auxiliary switch 22 is provided and shown only as might be required to meet emergency requirements and eliminates device 1 from the power supply 31 - relay 23 - bus-bar 24 circuit. Pilot light 25 is employed to show this condition.

During normal-operation, with all wiring and electrical apparatus functioning properly and with no overloading of the electrical supply or battery 31, the foregoing conditions would remain constant and the safety device 1 would have no effect on the circuit of bus-bar 24 except to activate it. Even if certain pieces of electrical apparatus 25 were turned on or off the safety device 1 would not be affected so long as the power available from supply 31 was sufficient to meet the demand and maintain normal voltage.

However, should there be usually high power demand from the electrical circuitry supply through bus-bar 24, such as might be caused by a short circuit in the wiring or malfunctioning of any of the electrical apparatus 25 of such magnitude that it might cause sufficient heating of the wiring or otherwise to present the possibility of danger of fire, the circuit voltage from power supply 31 would be reduced because of such excessive demand. Therefore, the voltage supplied to the diode 8 would be reduced and power transistor 9 would cease to function, thus cutting off the negative ground potential supplied through power transistor 9 to master switch relay 23, thereby opening it and shutting off power to the bus-bar 24 circuit and all electrical apparatus 25 connected to it.

It is obvious that to meet varying condition, especially as to the voltage of the power supply, the values and types of the components utilized in the safety device 1 might be varied to meet the particular requirements and without effecting the scope of this invention.

Under the conditions shown and hereby described, by way of example, and assuming a 12 volt power supply 31 capable of meeting all normal operating demands without overloading the supply 31, the power transistor 9 would cease to function when the voltage supplied to zener diode 8 was reduced, because of the overloaded circuitry, to approximately 10 volts (zener diode 8 being of 10 volt rating). This is a nominal value which will provide fire-safety protection since by actual test the circuit supply from a 12 volt battery to bus-bar 24 dropped to 8 volts under normal conditions when the aircraft engine starter was energized. Obviously an undue overload or direct short circuit in the bus-bar 24 circuitry would reduce the voltage to or below this value, so at 10 volt cut-off voltage great protection is given. However, trouble and potential danger is indicated when the reduced 10 volt level causes shut-off of power.

A further test, purposely using a partially-discharged battery proved that the starter would actually operate even when its heavy drain reduced the supply voltage to 6 volts. However, it is to be noted that the safety device 1 does not cut off bus-bar 24 supply even with reduced supply voltage during the engine starter operation as long as there is no undue drain from bus-bar circuitry since the master-switch relay 23 is held closed and operative during the time starter is actuated by reason of starter relay current passing through the coil of relay 23.

Although herein shown and described as for aircraft use and with 12 volt battery supply and being particularly applicable thereto, it will be realized that the scope of my invention is not to be restricted to such use.

For instance the power supply might be of any voltage and could be an electrical generator, rather than a battery, so long as its output was of such limited capacity that there would be sufficient reduction of voltage in the circuit only when under heavy overload, to be sensed by my device, using compatable values of components.

Having here disclosed my invention, what I claim as new and desire to protect by Letters Patent is:

1. Interposed in an electrical system which includes an electric power source having substantially constant voltage output while under normal load conditions such as a storage battery which is continuously having its charge maintained or replenished during use or an electric generator power supply, an electric apparatus load circuit, and an electromatic switching relay for connecting said power source to said load circuit to energize same; a solid-state electronic safety device for protection against the danger of fire originating in said apparatus load circuit comprising, in combination: a first solid-state electronic circuit means for initially actuating said relay to connect said load circuit to said constant-voltage power source; a second solid-state electronic circuit means which includes components of said first circuit means for maintaining actuation of said relay in said load circuit connecting condition under normal load drain from said constant voltage power source; and a solid-state electronic circuit voltage sensing means for deactuating said relay to disconnect said load circuit from said constant voltage power source should danger of fire occur by reason of excessive electric current drain due to defect or malfunction in said apparatus load circuit.

2. The safety device as set forth in claim 1 including solid-state electronic means for automatically and simultaneously deactivating said voltage sensing circuit means while maintaining actuation of the apparatus load connection during activation and energization of a second load circuit.

* * * * *